United States Patent [19]

Bechem

[11] Patent Number: 5,103,705
[45] Date of Patent: Apr. 14, 1992

[54] ECCENTRICALLY ARRANGED RADIAL BORING TOOL APPARATUS

[76] Inventor: Ulrich Bechem, Tiefendorferstrasse 87, D-5800 Hagen 1, Fed. Rep. of Germany

[21] Appl. No.: 610,456

[22] Filed: Nov. 6, 1990

Related U.S. Application Data

[63] Continuation of Ser. No. 291,553, Dec. 29, 1988, abandoned.

[30] Foreign Application Priority Data

Dec. 30, 1987 [CH] Switzerland .................. 5101/87

[51] Int. Cl.⁵ .................................. B26D 1/02
[52] U.S. Cl. .................... 83/491; 83/647.5; 51/90; 125/19; 125/20
[58] Field of Search .......... 173/49, 105; 125/12, 125/13.01, 19, 20, 16.01; 51/170 MT, 119, 120, 90; 83/483, 491, 646, 647.5; 74/86

[56] References Cited

U.S. PATENT DOCUMENTS

| 1,687,965 | 10/1928 | Ainley et al. | 51/90 |
| 2,685,154 | 8/1954 | Ballinger | 83/491 X |
| 3,468,384 | 9/1969 | Bodine | 173/49 |
| 4,285,405 | 8/1981 | Weir, Jr. | 173/49 |

FOREIGN PATENT DOCUMENTS

| 4620797 | 2/1967 | Japan | 51/120 |
| 261179 | 11/1926 | United Kingdom | 125/13 |

Primary Examiner—Douglas D. Watts
Assistant Examiner—C. Dexter
Attorney, Agent, or Firm—Kinney & Lange

[57] ABSTRACT

An apparatus for percussively milling slots in rock or the like includes a flat disk-like radial boring tool mounted on a drive shaft which is rotated slowly against the work while being driven percussively and radially outwardly toward the work in the neighborhood of, for example, forty times for every revolution of the tool.

2 Claims, 1 Drawing Sheet

ECCENTRICALLY ARRANGED RADIAL BORING TOOL APPARATUS

This is a continuation of application Ser. No. 07/291,553 filed on Dec. 29, 1988, abandoned as of the date of this application.

The invention relates to a cutting assembly more particularly it relates to a cutting assembly for a mining machine.

According to the invention there is provided a cutting assembly which includes a cutting tool connected to a rotatable shaft held captive in eccentric arrangement within an independently rotatable sleeve.

The cutting assembly includes drive means acting on a portion of the shaft remote from cutting tool.

The cutting tool operates percussively while simultaneously performing a milling action.

The invention is further described below by way of diagrammatic examples in which:

FIG. 1 shows a side elevation of a cutting assembly according to the invention in vertical cross-section; and FIG. 2 shows a side elevation of a cutting assembly in a further embodiment of the invention, also in vertical cross-section.

DETAILED DESCRIPTION OF THE PREFERRED EMBODIMENTS

Figure 1:
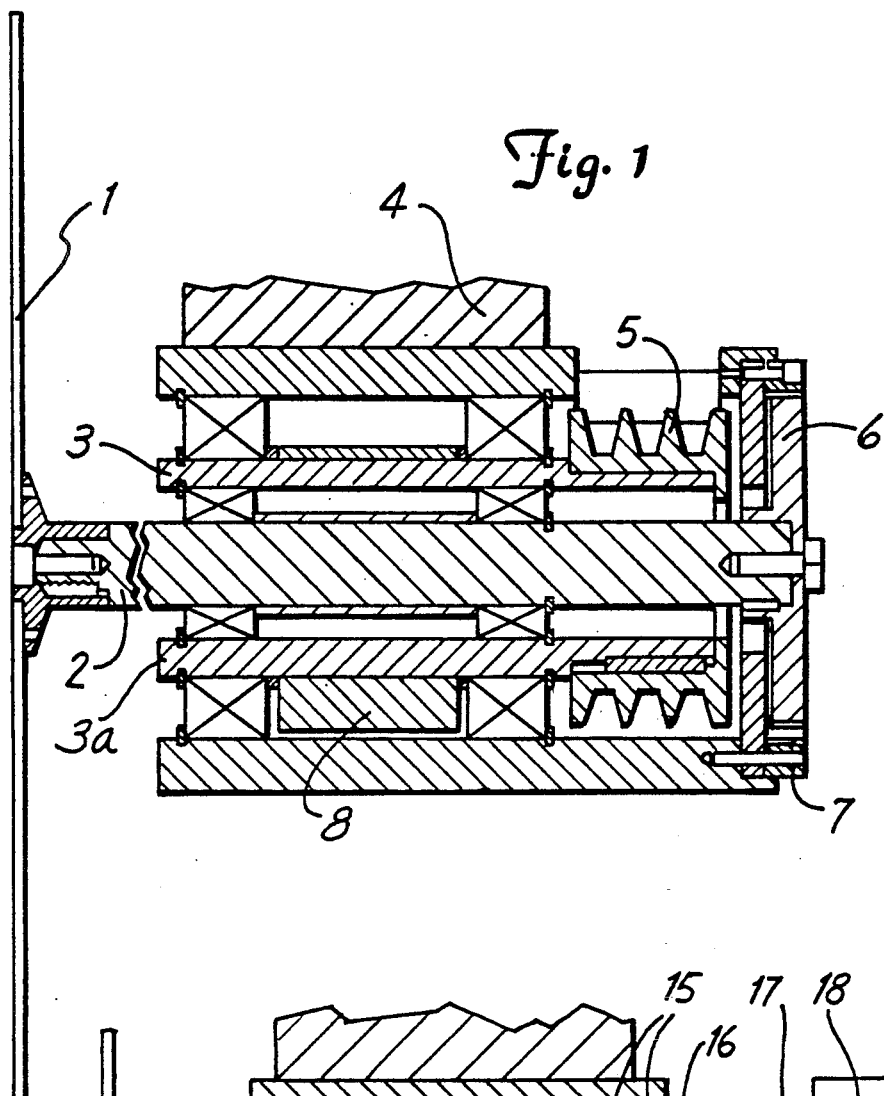

In FIG. 1, reference numeral 1 denotes a cutting disc of 300 mm diameter and 5 mm thick equipped with cutting teeth, mounted on a freely rotatable shaft 2. This shaft is held captive by a rotatable sleeve denoted 3 and 3a, sleeve 3 and shaft 2 being in eccentric relationship with each other. The sleeve 3 is driven by means of V-belts engaging a pulley 5 which is integrally connected to the sleeve. In other embodiments, the shaft 2 may be driven by gears, or other similar means. In this embodiment, the shaft 2 is rotatable at substantially slower speeds than the sleeve 3 by way of an external gear 6. Gear 6 is secured to the shaft 2 and meshes with an internal ring gear 7, which is secured to a stationary housing 4. The gear 6 and the ring gear 7 are arranged in eccentric relationship to each other. The cutting assembly described above is balanced by adjusting counterweights 8.

Figure 2:
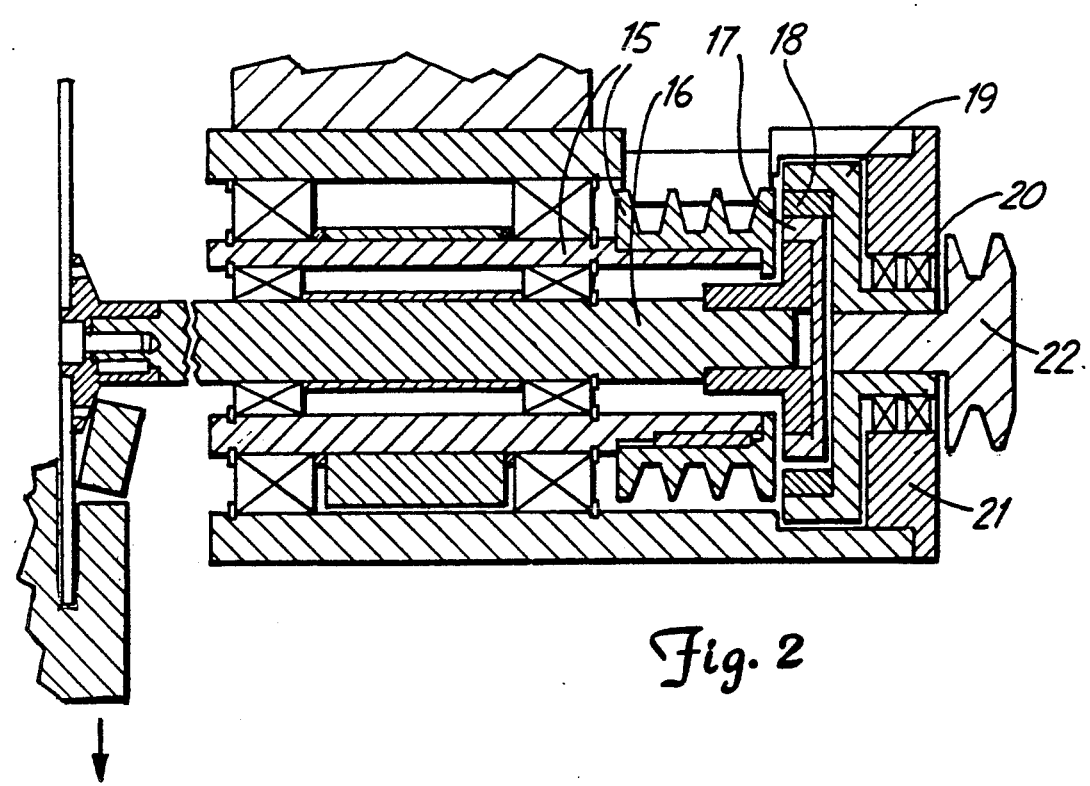

FIG. 2 illustrates a further preferred embodiment of the invention. In this embodiment reference numeral 15 denotes a rotatable sleeve, while reference numeral 16 denotes a rotatable shaft held captive by the sleeve, the sleeve 15 and the shaft 16 being in eccentric relationship with each other. The shaft 16 has a cutting disc 1 mounted at one end. The shaft 16 is driven indirectly by a V-belt engaging a pulley 22 through an external gear 17 integrally connected to the shaft 16 and an internal ring gear 18. External gear 17 and internal ring gear 18 mesh with each other in eccentric relationship. In other embodiments, the shaft 16 may be indirectly driven by gears or other similar means.

The ring gear 18 is fastened to a rotatable sleeve 19 which is connected to the pulley 22 and supported on a stationary housing 21 by means of bearings 20. The drive speed of the shaft 16 is adjustable by variation of the speed of rotation of the pulley 22.

In use, the sleeve 3 or the sleeve 15, as the case may be, is driven at a speed of approximately 4000 rpm while the shaft 2 or the shaft 16 is caused to rotate at approximately 100 rpm. The cutting assembly is thereby capable of operating percussively while the disc 1 simultaneously performs a milling action in order to undercut rock or stone. See FIG. 2. The force that needs to be applied in order to cut even relatively hard rock is on the order of 100 kg.

I claim:

1. A cutting assembly comprising:
   at least one cutting tool connected to a rotatable shaft and including a rotatable sleeve being arranged in eccentric relationship with respect to the rotatable shaft, with the rotatable shaft being held captive by the sleeve, and the shaft and the sleeve being rotatable with respect to a stationary housing; and
   drive means for rotating the shaft, the drive means acting on a portion of the shaft remote from a tool bearing portion of the shaft, the drive means including an externally toothed gear connected to the shaft in eccentric relationship to and meshing with, an internally toothed ring gear mounted to the stationary housing.

2. A cutting assembly according to claim 1 in which the drive means is operable at variable speeds.

* * * * *